United States Patent
Gyoten et al.

[11] Patent Number: 5,747,949
[45] Date of Patent: May 5, 1998

[54] CRT FOCUSING CIRCUIT WITH INDIVIDUALLY CONTROLLED SWITCHES DEVELOPING AN APPROXIMATE PARABOLIC WAVEFORM

[75] Inventors: Takaaki Gyoten, Kobe; Masahiro Kawashima, Takatsuki, both of Japan

[73] Assignee: Matsushita Electric Industrial Co., Ltd., Osaka, Japan

[21] Appl. No.: 569,279

[22] Filed: Dec. 8, 1995

[30] Foreign Application Priority Data

Dec. 9, 1994 [JP] Japan ................................ 6-305985

[51] Int. Cl.⁶ .................................................. H01J 29/58
[52] U.S. Cl. ........................................ 315/382.1; 348/806
[58] Field of Search ........................... 315/3, 370, 382, 315/382.1, 399, 400, 403, 406, 407, 408, 409; 348/806, 807

[56] References Cited

U.S. PATENT DOCUMENTS

| | | | |
|---|---|---|---|
| 3,622,836 | 11/1971 | Nielsen | 315/382 X |
| 3,911,295 | 10/1975 | Barkow | 315/399 X |
| 4,499,457 | 2/1985 | Hintze | 315/382 X |
| 5,331,256 | 7/1994 | Ogino et al. | 315/382 |
| 5,332,953 | 7/1994 | Hartman et al. | 315/382 |
| 5,512,804 | 4/1996 | Yamamoto | 315/382.1 |

FOREIGN PATENT DOCUMENTS

| | | |
|---|---|---|
| 0 643 532 | 3/1995 | European Pat. Off. . |
| 2 321 767 | 3/1977 | France . |
| 1 247 379 | 8/1967 | Germany . |
| 06292035 | 10/1994 | Japan . |

*Primary Examiner*—Robert Pascal
*Assistant Examiner*—Justin P. Bettendorf
*Attorney, Agent, or Firm*—Ratner & Prestia

[57] ABSTRACT

A control means individually turns each switching means on or off so that a current has a waveform which is approximate to a parabolic waveform and is appropriate for focusing current flows in a focusing coil, synchronizing with a horizontal sweep. When the focusing current increases, energy is transferred from the power source to the focusing coil. When the focusing current decreases, energy is returned from the focusing coil to the power source by a flywheel current. Thus, the focusing current is supplied with less consumption.

18 Claims, 21 Drawing Sheets

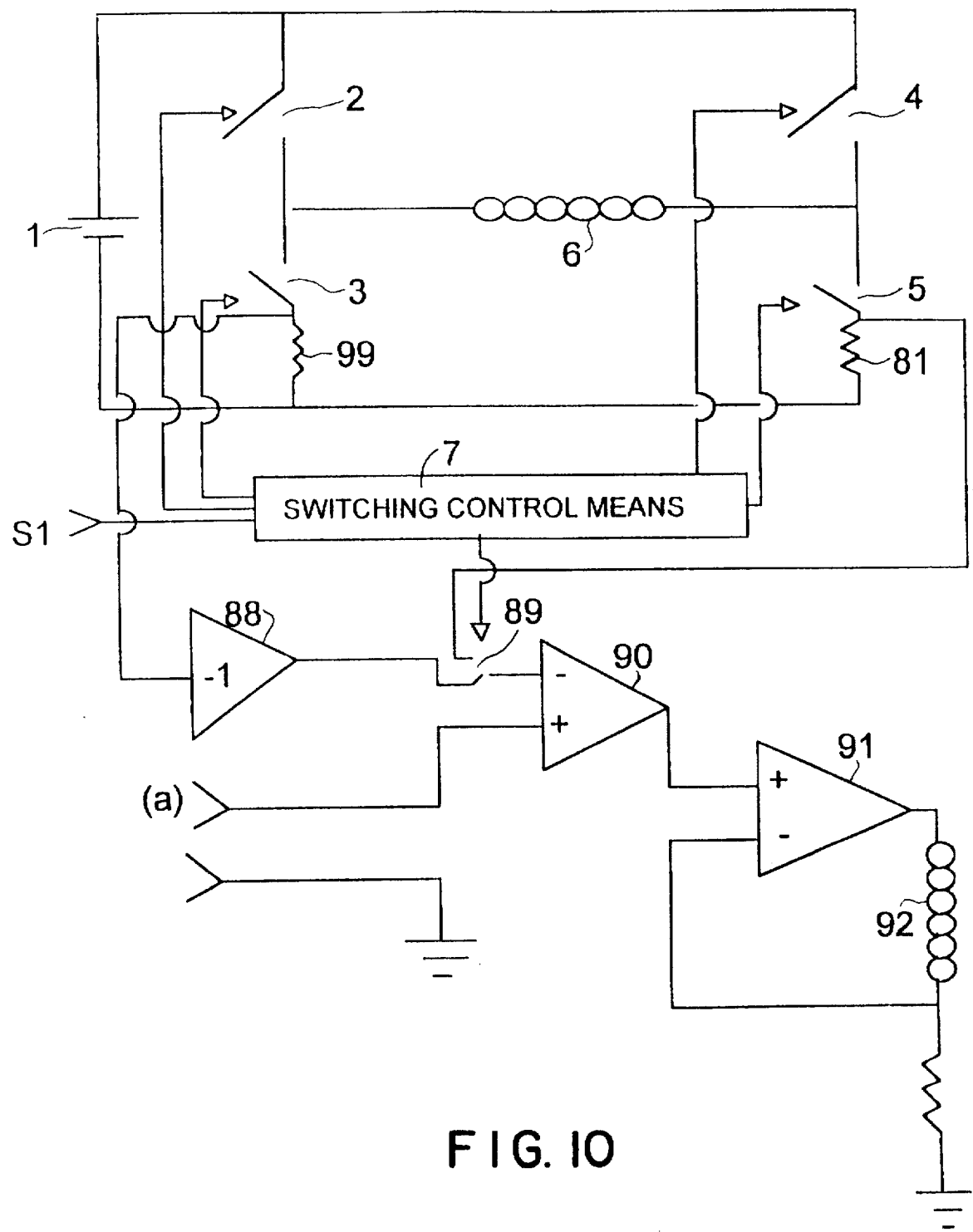
F I G. 10

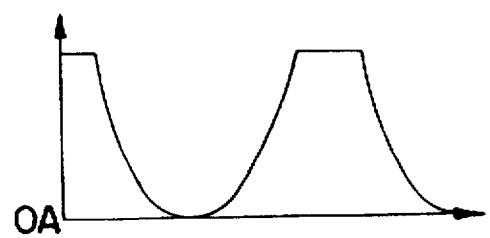
FIG. 12A
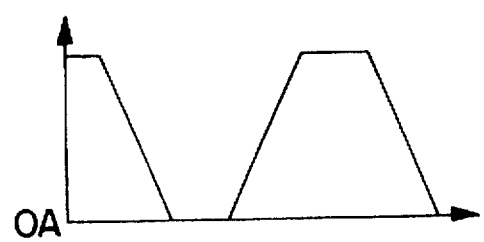
FIG. 12B
FIG. 12C
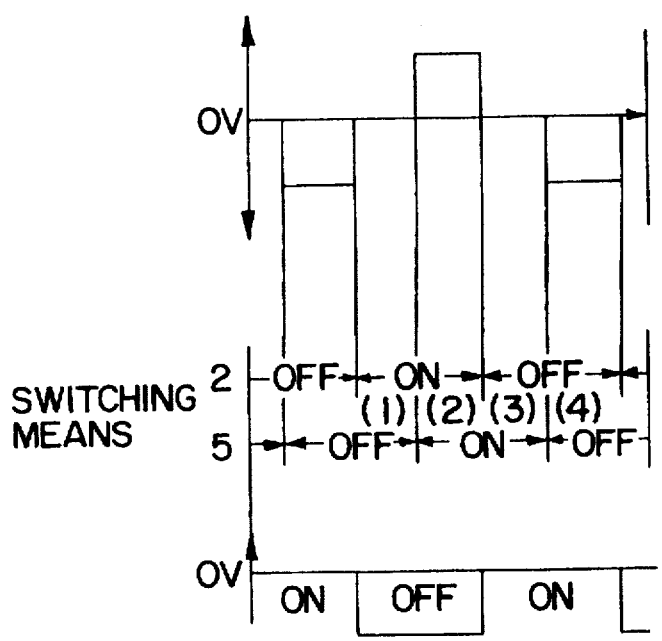
FIG. 12D
FIG. 12E
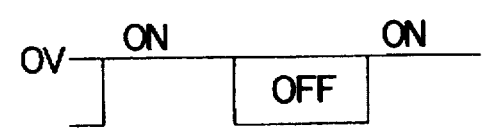
FIG. 12F

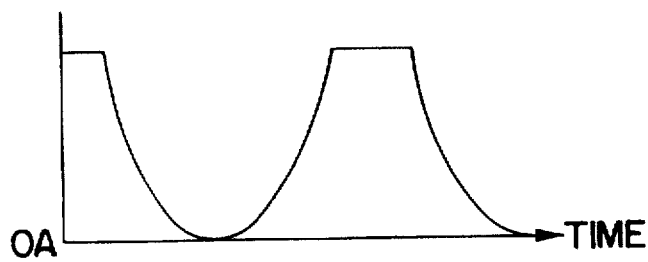
FIG. 13A
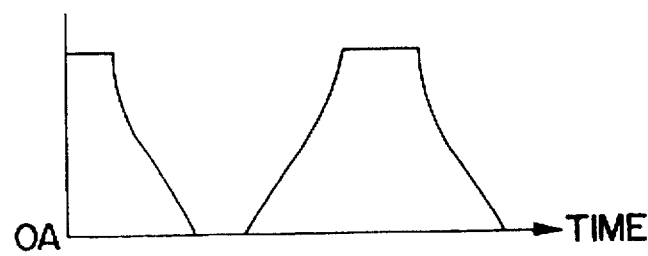
FIG. 13B
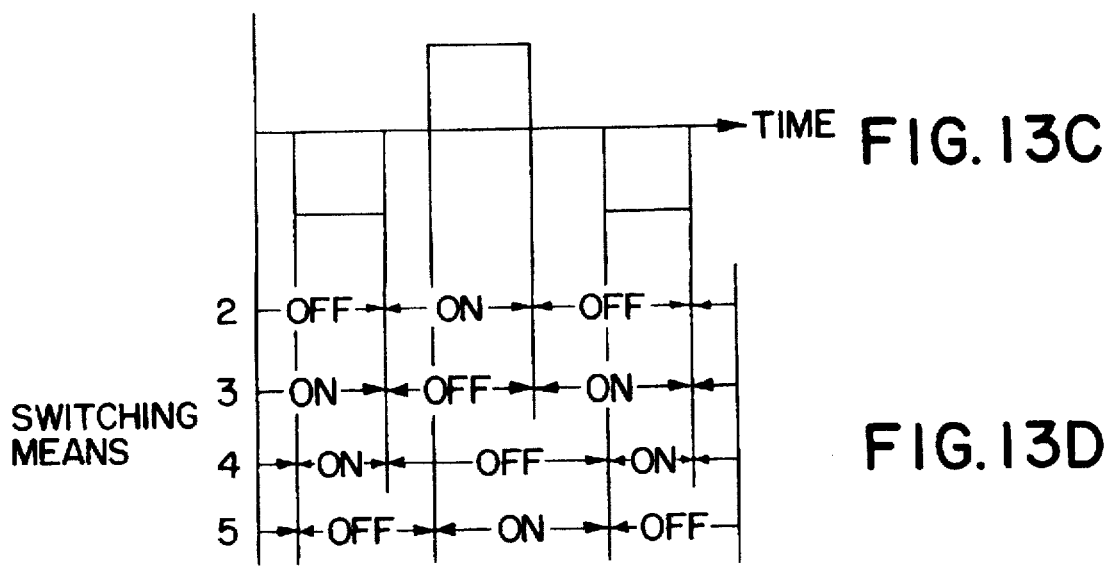
FIG. 13C
FIG. 13D

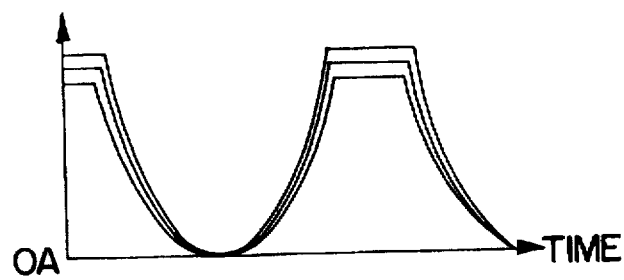
FIG. 14A
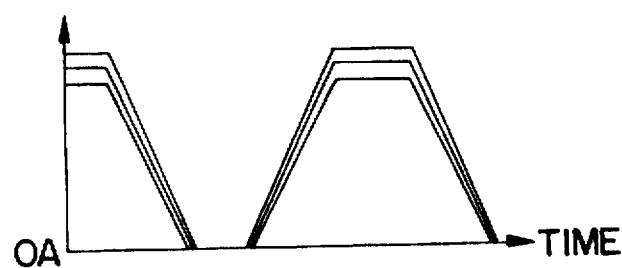
FIG. 14B
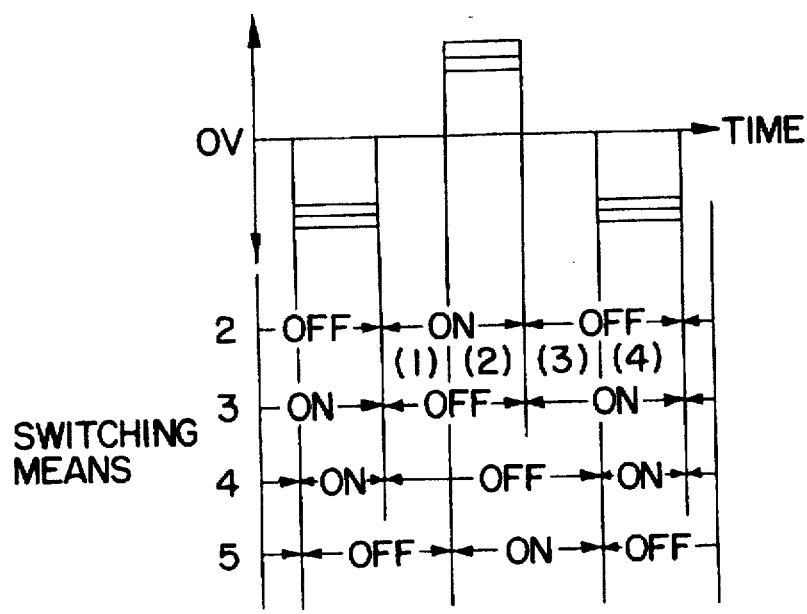
FIG. 14C
FIG. 14D

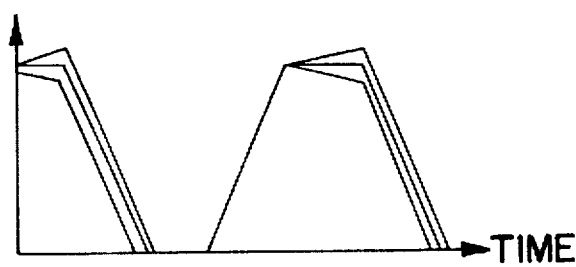
FIG.17A
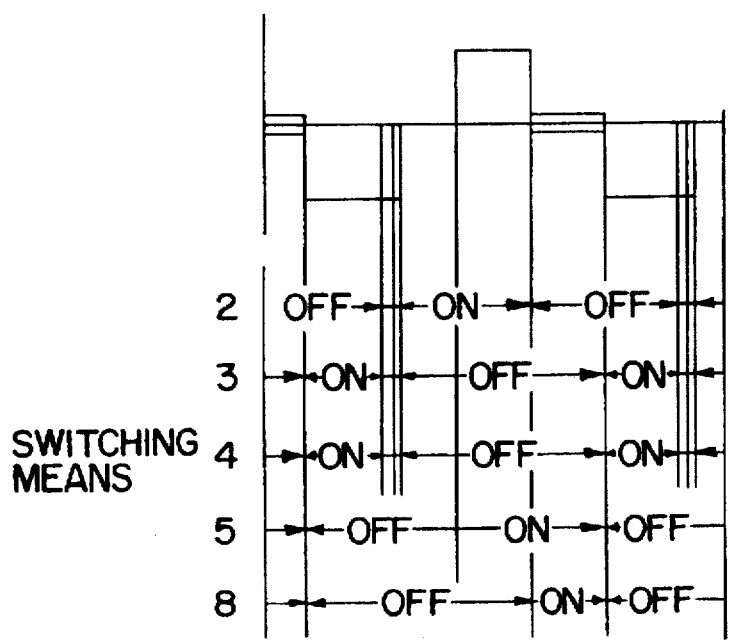
FIG.17B
FIG.17C

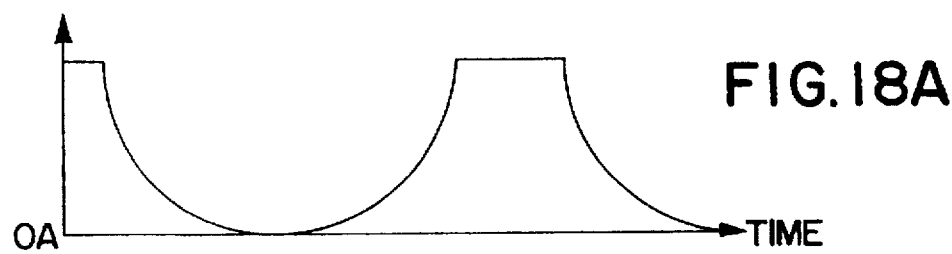
FIG.18A
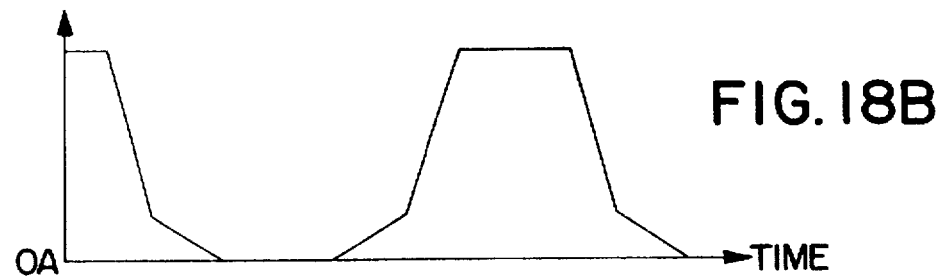
FIG.18B
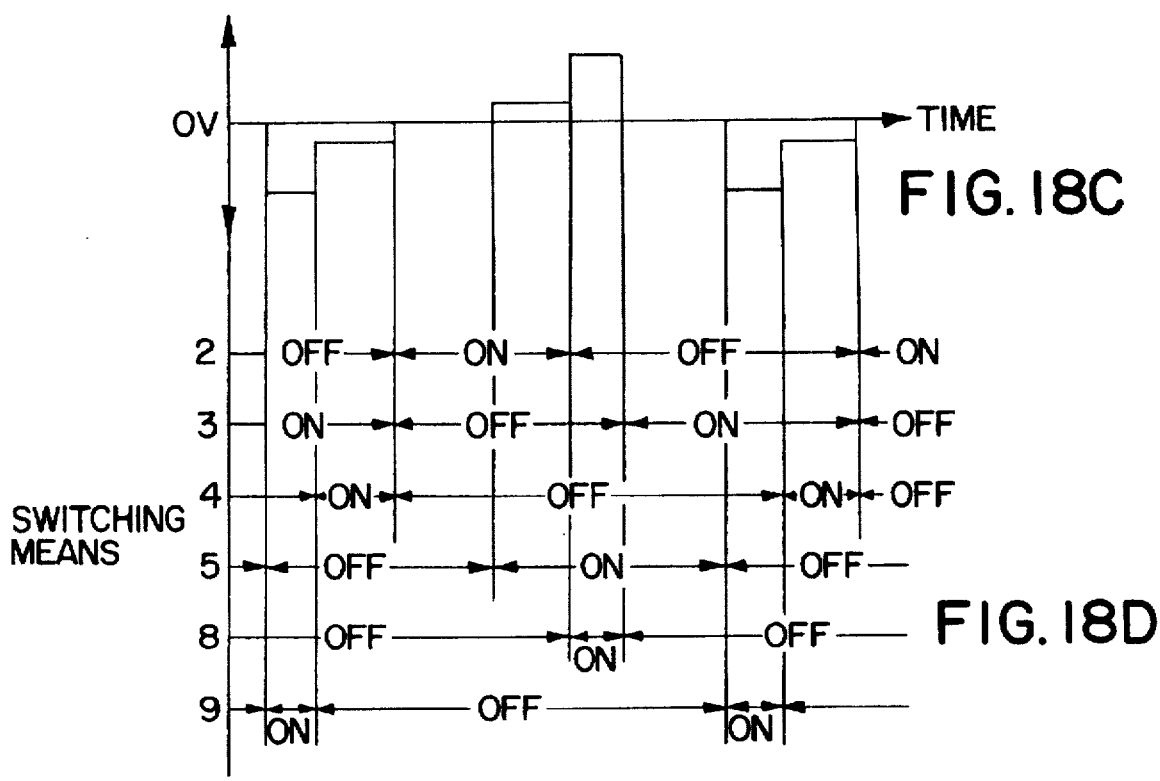
FIG.18C
FIG.18D

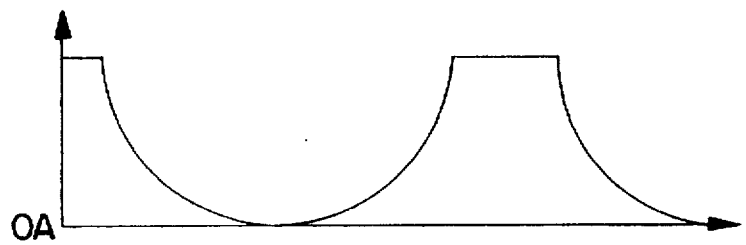
FIG. 19A
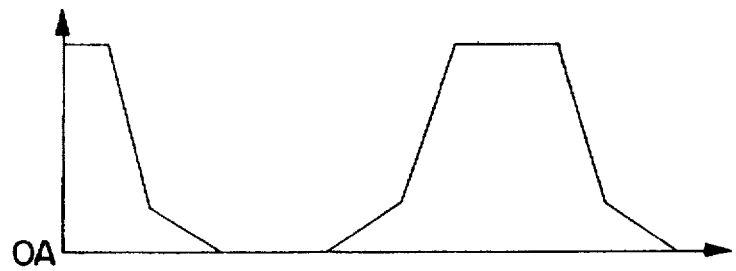
FIG. 19B
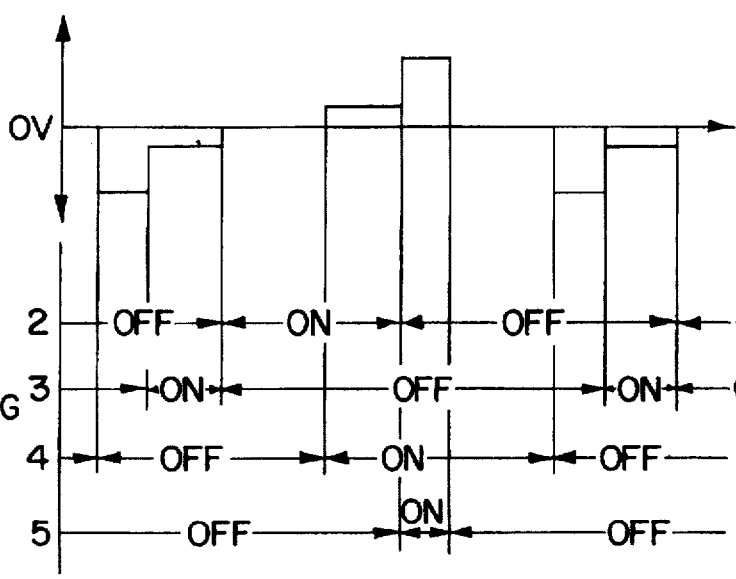
FIG. 19C
FIG. 19D
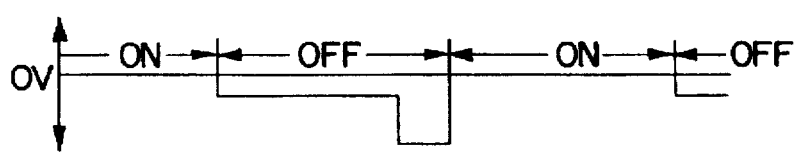
FIG. 19E
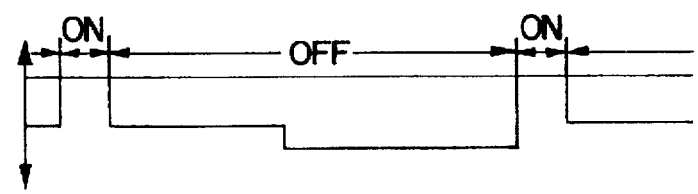
FIG. 19F

CRT FOCUSING CIRCUIT WITH INDIVIDUALLY CONTROLLED SWITCHES DEVELOPING AN APPROXIMATE PARABOLIC WAVEFORM

FIELD OF THE INVENTION

The present invention relates to an electromagnetic focusing circuit for a cathode-ray tube (CRT, hereafter) used in such as a television receivers and projection type display apparatus.

BACKGROUND OF THE INVENTION

In order to obtain a high quality picture for high definition television receivers, ClearVision receivers or computer display terminals, it has been desired to improve a focusing circuit for a CRT. The present invention provides an improvement of the electromagnetic focusing circuit. The electromagnetic focusing circuit is used for a CRT, for instance, in a projection type display apparatus which requires very big current density of an electron beam.

FIG. 21 shows an electromagnetic focusing circuit in accordance with the prior art. A class-A amplifier 94 amplifies with class-A the difference between a focusing current signal S3 and a voltage across a current detection resistor 96 and supplies a focusing current I to a focusing coil 95.

Focusing current I is derived from eqs. 1, 2 and 3 and is expressed by eq. 4

$$E = A(S3 - RI) \qquad (eq. 1)$$

$$I = E/(2\Pi jFL + R) \qquad (eq. 2)$$

where

E: output voltage of class-A amplifier 94,

A: amplification factor of class-A amplifier 94,

R: resistance of current detection resistor 96,

L: inductance of focusing coil 95, j: imaginary number symbol, and f: frequency.

From eqs. 1 and 2, $$I(2\Pi jFL + R)/A = S3 - RI \qquad (eq. 3)$$

Assuming A is very large, then from eq. 3, $$I = S3/R \qquad (eq. 4)$$

That is, focusing current I is proportional to focusing current signal S3.

FIGS. 22(a), 22(b) and 22(c) show waveforms of focusing current signal S3, voltage across focusing coil and focusing current i, respectively. The voltage across the focusing coil shown in FIG. 22(b) is expressed by L(di/dt).

Recently, in various cases, a horizontal frequency is increased for getting a high quality picture at multi horizontal sweeps. Because the value di/dt is proportional to a horizontal frequency, the voltage across the focusing coil increases in proportion to the horizontal frequency. Therefore, the supply voltage to class-A amplifier 94 which outputs a focusing current must be increased at least in proportion to the increase of the horizontal frequency. It naturally causes to increase power consumption of class-A amplifier 94. Recently, CRT surfaces are being made flatter or in a projection type, CRT surfaces are being made concave to shorten a projection distance or a deflection angle is being made wider to shorten the CRT length and these result in increase of the beam length difference between the center and the peripheral part of the CRT. Therefore, a larger current is required in focusing and the power consumption in class-A amplifier 94 increases more. An electromagnetic focusing circuit in accordance with the present invention is useful for low power consumption.

SUMMARY OF THE INVENTION

An electromagnetic focusing circuit in accordance with the present invention comprises a combination of a plurality of switching means. Each switching means is individually switched on or off so that a current which is approximate to a parabolic waveform current to realize desirable focusing flows in the focusing coil, synchronizing with a horizontal sweep. When the focusing current increases, energy is given from the power source to the focusing coil. When the focusing current decreases, however, the energy is returned from the focusing coil to the power source by a flywheel current. Therefore, the focusing current is supplied with a less consumption.

In a first exemplary embodiment of the present invention shown in FIG. 1, an electromagnetic focusing circuit comprising a combination of four pieces of switching means which supplies a trapezoid current that is approximate to a parabolic waveform by the following steps, that is, a trapezoid focusing current approximate to a parabolic waveform is supplied by a combination of on and off actions of four pieces of switching means as shown in FIG. 11.

Period 1: The focusing current is zero.

Period 2: The focusing coil is connected to the power source. The focusing current increases linearly from zero with a slope. During this period, the power source supplies energy to the focusing coil.

Period 3: The power source is disconnected from the focusing coil and the focusing coil is short circuited. The focusing current during this period is generated by the energy stored in the inductance of the focusing coil and this is a flywheel current flowing around the short circuited circuit. Because the loss in the short circuited circuit is small, the attenuation of the focusing current is small.

Period 4: The power supply is inserted in the short circuited circuit in a reverse direction to the flywheel current. The focusing current during this period is a flywheel current which flows continuously from period 3 at first and decreases linearly with a slope toward zero. The flywheel current flows against the supply voltage, charging the power source on the way of decreasing. Thus, a trapezoid current is generated. During this period, the focusing coil returns energy to the power source and low power consumption is realized.

In a second exemplary embodiment of the present invention shown in FIG. 2, two diodes are used instead of two pieces of switching means in the first exemplary embodiment for circuit simplification.

In a third exemplary embodiment of the present invention shown in FIG. 3, a saturable-core reactor is inserted in series of the focusing coil in the first exemplary embodiment to get a better focusing.

In a fourth exemplary embodiment of the present invention shown in FIG. 4, means for varying a supply voltage is provided.

In a fifth exemplary embodiment of the present invention shown in FIG. 5, the supply voltage is varied corresponding to the focusing current to stabilize the focusing current.

In a sixth exemplary embodiment of the present invention shown in FIG. 6, the supply voltage is varied according to the focusing current to stabilize the focusing current.

In a seventh exemplary embodiment of the present invention shown in FIG. 7, a second power source is inserted in series of the focusing coil during period 2 in the first exemplary embodiment. The flywheel current during period 2 is varied by the second power source.

In an eighth exemplary embodiment of the present invention shown in FIG. 8, a second power source and a fifth switching means and a sixth switching means are further added so that the focusing current more closely approximates to a parabolic waveform to realize a desirable focusing.

In a ninth exemplary embodiment of the present invention shown in FIG. 9, two diodes are used instead of two pieces of switching means of the eighth exemplary embodiment for circuit simplification.

In a tenth exemplary embodiment of the present invention shown in FIG. 10, a current corresponding to a difference between the trapezoid waveform and the parabolic waveform is supplied to a second focusing coil so as to realize desirable focusing.

BRIEF DESCRIPTION OF THE DRAWINGS

FIG. 10 is an electromagnetic focusing circuit in accordance with a tenth exemplary embodiment of the present invention.

FIG. 11($a$) is a desirable waveform of the focusing current.

FIG. 11($b$) is a waveform of the focusing current.

FIG. 11($c$) is a waveform of the focusing coil voltage.

FIG. 11($d$) shows on/off periods of switching means.

FIG. 12 shows voltage and current waveforms and switching periods of an electromagnetic focusing circuit in accordance with the second exemplary embodiment of the present invention.

FIG. 12($a$) is a desirable waveform of the focusing current.

FIG. 12($b$) is a waveform of the focusing current.

FIG. 12($c$) is a waveform of the focusing coil voltage.

FIG. 12($d$) shows on/off periods of switching means.

FIG. 12($e$) is a voltage waveform of diode 10.

FIG. 12($f$) is a voltage waveform of diode 11.

FIG. 13 shows voltage and current waveforms and switching periods of an electromagnetic focusing circuit in accordance with the third exemplary embodiment of the present invention.

FIG. 13($a$) is a desirable waveform of the focusing current.

FIG. 13($b$) is a waveform of the focusing current.

FIG. 13($c$) is a waveform of the focusing coil voltage.

FIG. 13($d$) shows on/off periods of switching means.

FIG. 14 shows voltage and current waveforms and switching periods of an electromagnetic focusing circuit in accordance with the fourth exemplary embodiment of the present invention.

FIG. 14($a$) is a desirable waveform of the focusing current.

FIG. 14($b$) is a waveform of the focusing current.

FIG. 14($c$) is a waveform of the focusing coil voltage.

FIG. 14($d$) shows on/off periods of switching means.

FIG. 15($a$) is a waveform of the output voltage across current detection resistor 38.

FIG. 15($b$) is a waveform of the output voltage of current detection circuit 39.

FIG. 16($a$) is a waveform of the output voltage across current detection resistor 38.

FIG. 16($b$) is a waveform of the output voltage of current detection circuit 39.

FIG. 17 shows voltage and current waveforms and switching periods of an electromagnetic focusing circuit in accordance with the seventh exemplary embodiment of the present invention.

FIG. 17($a$) is a waveform of the focusing current.

FIG. 17($b$) is a waveform of the focusing coil voltage.

FIG. 17($c$) shows on/off periods of switching means.

FIG. 18 shows voltage and current waveforms and switching periods of an electromagnetic focusing circuit in accordance with the eighth exemplary embodiment of the present invention.

FIG. 18($a$) is a desirable waveform of the focusing current.

FIG. 18($b$) is a waveform of the focusing current.

FIG. 18($c$) is a waveform of the focusing coil voltage.

FIG. 18($d$) shows on/off periods of switching means.

FIG. 19 shows voltage and current waveforms and switching periods of an electromagnetic focusing circuit in accordance with the ninth exemplary embodiment of the present invention.

FIG. 19(a) is a desirable waveform of the focusing current.

FIG. 19(b) is a waveform of the focusing current.

FIG. 19(c) is a waveform of the focusing coil voltage.

FIG. 19(d) shows on/off periods of switching means.

FIG. 19(e) is a waveform across diode 10.

FIG. 19(f) is a waveform across diode 11.

FIG. 20 shows voltage and current waveforms and switching periods of an electromagnetic focusing circuit in accordance with the tenth exemplary embodiment of the present invention.

EXEMPLARY EMBODIMENT (First exemplary embodiment

Figure 1:
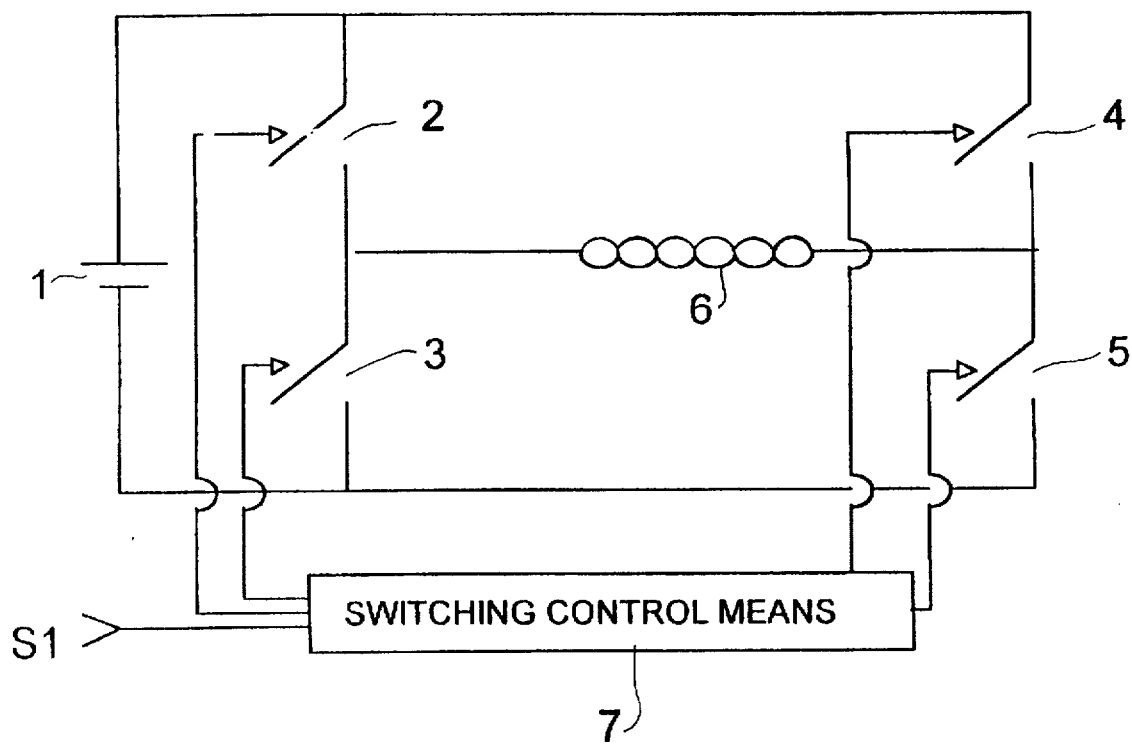
FIG. 1 is an electromagnetic focusing circuit in accordance with a first exemplary embodiment of the present invention.

FIG. 1 is an electromagnetic focusing circuit in accordance with a first exemplary embodiment of the present invention. The supply voltage of a power source 1 is set according to a horizontal frequency so as to be large enough to supply a focusing current. Switching control means 7 individually turns on or off each of switching means 2, 3, 4 and 5, using a horizontal signal S1 as a time reference so as to generate a focusing current appropriate to supply to a focusing coil 6.

Figure 11A:
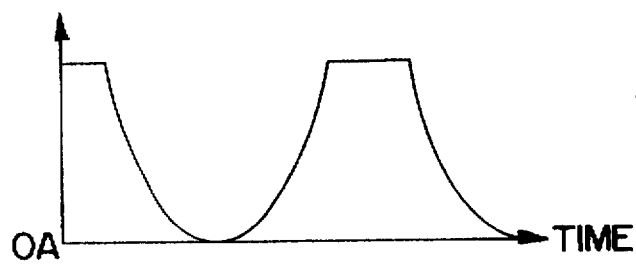
FIG. 11 shows voltage and current waveforms and switching periods of an electromagnetic focusing circuit in accordance with the first exemplary embodiment of the present invention.
Figure 11B:
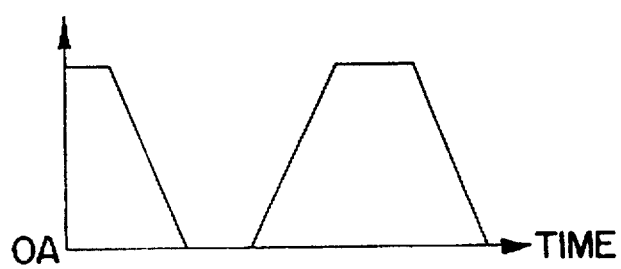
Figure 11C:
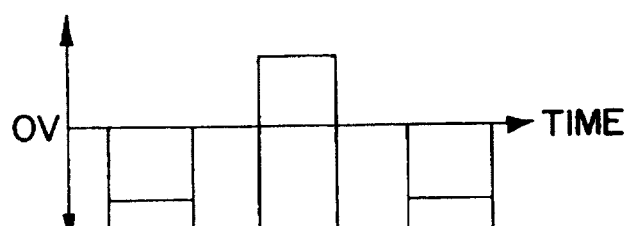
Figure 11D:
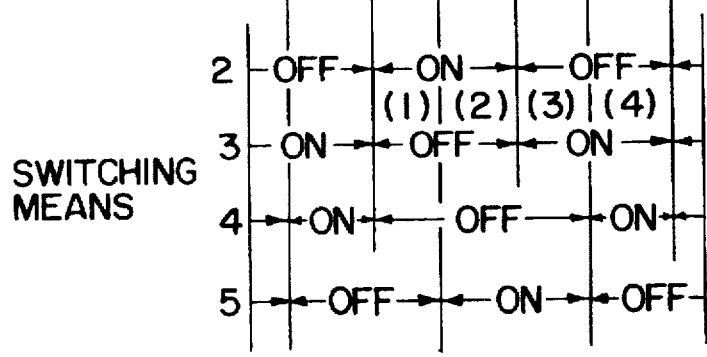

The on and off periods of each of switching means are shown in FIG. 11(d). One cycle of the focusing current is a period from period (1) to period (4). By on/off actions of each switching means, a focusing coil voltage shown in FIG. 11(c) is applied across focusing coil 6. As previously described, the focusing coil voltage is equal to L(di/dt). In other words, the focusing current flowing in the focusing coil is an integral of the focusing coil voltage. The focusing current becomes as shown in FIG. 11(b). FIG. 11(a) is a parabolic waveform of a desirable focusing current. The trapezoid focusing current shown in FIG. 11(b) is shown as one-directional and is what is tried to approximate to a desirable focusing current shown in FIG. 11(a).

The detail of the focusing current during each period is explained below.

Period 1: Only switching means 2 is turned on. The focusing coil voltage and the focusing current are zero.

Period 2: Switching means 2 and 5 are on. The supply voltage is applied to the focusing coil through switching means 2 and 5. The focusing current linearly increases from zero with a slope so that the induced voltage of the focusing coil L(di/dt) becomes equal to the supply voltage. The increasing current is approximate to the desirable parabolic waveform shown in FIG. 11(a). During this period, the power source supplies energy to the focusing coil.

Period 3: Switching means 2 is turned off and switching means 3 is turned on. Focusing coil 6, switching means 5 and switching means 3 form a short circuited loop. The focusing current during this period is generated by the energy stored in the inductance of focusing coil 6 and is a flywheel current flowing around the above described short circuited loop. Because the loss of the short circuited loop is small, the attenuation of the focusing current during this period is small.

Period 4: Switching means 5 is turned off and switching means 4 is turned on. Power source 1 is connected to focusing coil 6 in the reverse polarity. The focusing current during this period is a flywheel current which continues from the previous period 3 at first and decreases linearly to zero with a slope. The flywheel current flows against the supply voltage, charging the power source on the way of decrease. The decreasing current is approximate to the desirable parabolic waveform as shown in FIG. 11(a). During the period, the focusing coil returns energy to the power source by charging the flywheel current to the power source. Thus, low power consumption is realized.

(Second exemplary embodiment

Figure 2:
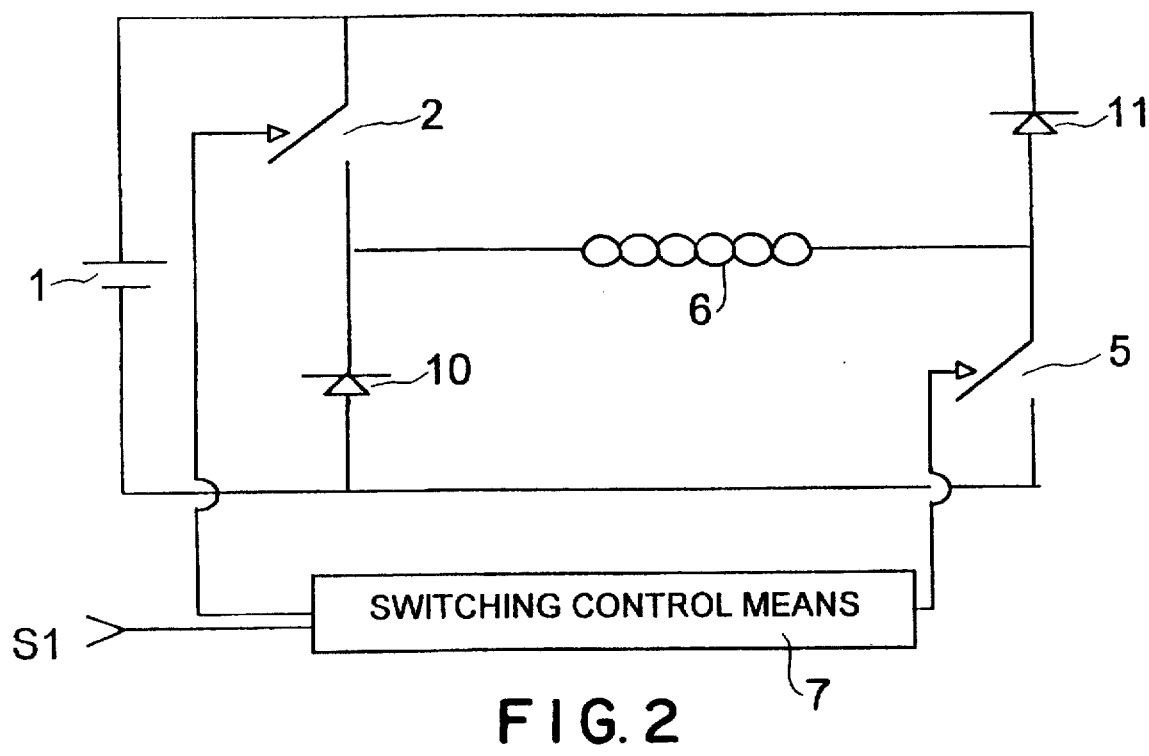
FIG. 2 is an electromagnetic focusing circuit in accordance with a second exemplary embodiment of the present invention.

FIG. 2 is an electromagnetic focusing circuit in accordance with a second exemplary embodiment of the present invention. The second exemplary embodiment is obtained by replacing the switching means 3 and 4 in the first exemplary embodiment in which flywheel currents flow to the diodes 10 and 11 Because the replacement does not give any influence on the flywheel current, the second exemplary embodiment works similarly to the first exemplary embodiment. The components having similar functions to those in FIG. 1 are numbered with the same reference numbers.

The on and off periods of each switching means are shown in FIG. 12(d). As a result, a voltage shown in FIG. 12 (c) is applied across focusing coil 6. As previously described, because the voltage across the focusing coil is expressed by L(di/dt), the focusing current flowing in focusing coil 6 is shown by FIG. 12(b). FIG. 12(a) is a waveform of a desirable focusing current. The focusing current shown in FIG. 12(b) is approximate to the waveform shown in FIG. 12(a). FIGS. 12(e) and 12(f) show voltage waveforms across diodes 10 and 11, respectively.

The replacement of the switching means in which the flywheel current flows into a diode can be usefully applied to the other exemplary embodiments of the present invention.

(Third exemplary embodiment

Figure 3:
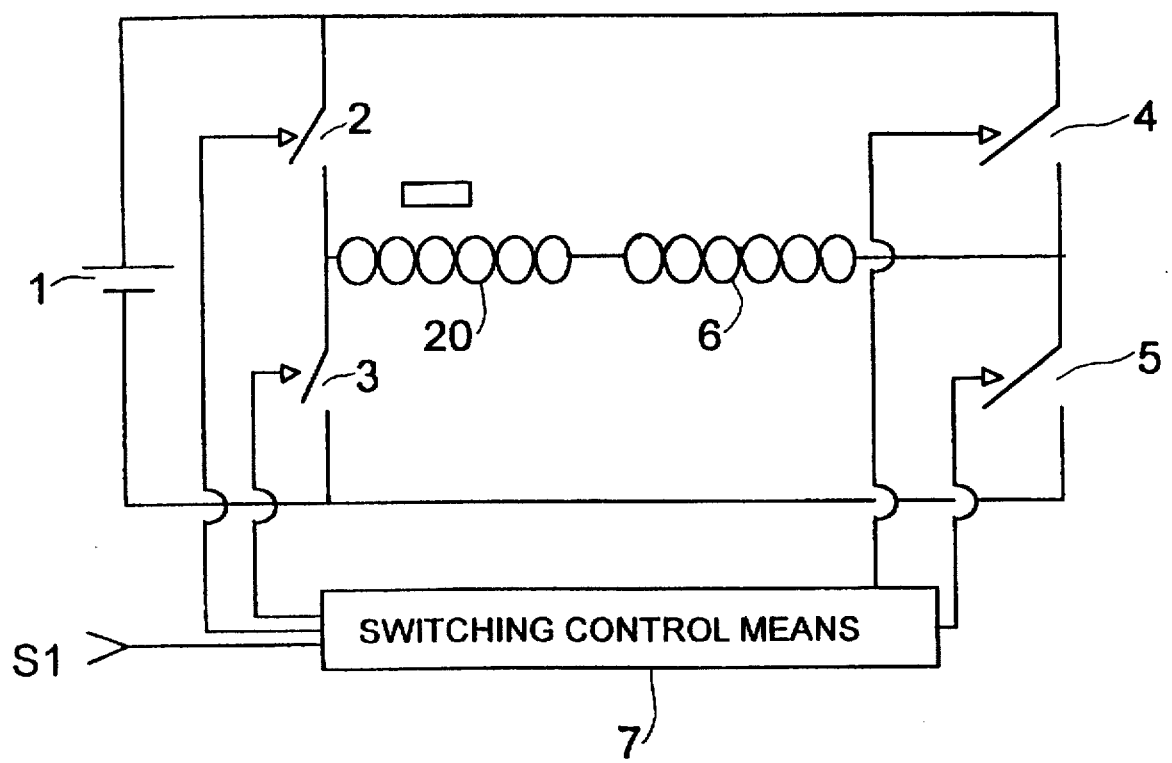
FIG. 3 is an electromagnetic focusing circuit in accordance with a third exemplary embodiment of the present invention.

FIG. 3 is an electromagnetic focusing circuit in accordance with a third exemplary embodiment of the present invention. The third exemplary embodiment is what a saturable-core reactor 20 is connected in series with focusing coil 6 in the first exemplary embodiment. The third exemplary embodiment is similar to the first exemplary embodiment except that the waveform of the focusing current has a curvature. The components having similar functions to those in FIG. 1 are numbered with the same reference numbers.

The on and off periods of each switching means are shown in FIG. 13(d). As a result, a voltage shown in FIG. 13 (c) is applied across the series connection of focusing coil 6 and saturable core reactor 20. If the inductance of the above series connection is constant, the focusing current is to be linear similarly to the previous exemplary embodiments. However, because the inductance of saturable-core reactor 20 decreases with the current increase, a curved focusing current shown in FIG. 13(b) flows on the series connection of focusing coil 6 and saturable-core reactor 20. FIG. 13(a) is a desirable parabolic waveform of the focusing current. The focusing current shown in FIG. 13(b) is approximate to the desirable parabolic waveform better than those in the previous exemplary embodiments.

(Fourth exemplary embodiment

Figure 4:
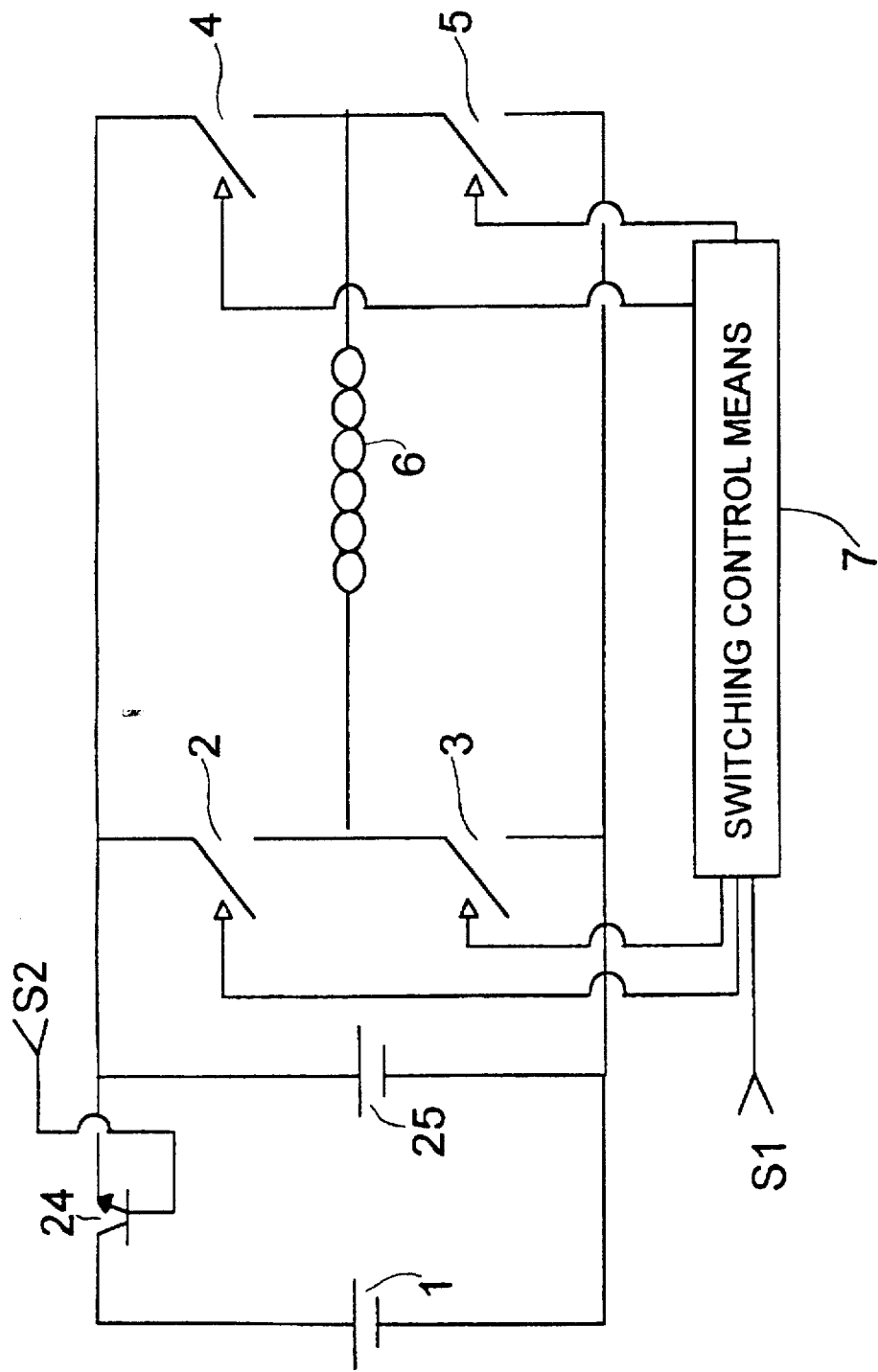
FIG. 4 is an electromagnetic focusing circuit in accordance with a fourth exemplary embodiment of the present invention.

FIG. 4 is an electromagnetic focusing circuit in accordance with a fourth exemplary embodiment of the present invention. The fourth exemplary embodiment includes current control means 24 connected in series to power source 1 and a capacitor 25 connected in parallel to the above mentioned series connection in the first exemplary embodiment. The components having similar functions to those in FIG. 1 are numbered with the same reference numbers.

Capacitor 25 outputs a focusing current and is charged by a flywheel current of focusing coil 6. That is, capacitor 25 is equivalent to a power source. The fourth exemplary embodiment is similar to the first exemplary embodiment except that the supply voltage can be varied by a control signal S2.

The on and off periods of each switching means are shown in FIG. 14(d). As a result, the voltage shown in FIG. 14(c) is applied to focusing coil 6. Three waveforms corresponding to three values of capacitor voltage are shown in the same drawings. the focusing current shown in FIG. 14(b) flows through focusing coil 6. FIG. 14(a) is a desirable parabolic waveform of the focusing current. The focusing current shown in FIG. 14(b) is approximate to the desirable parabolic waveform shown in FIG. 14(a).

(Fifth exemplary embodiment

Figure 5:
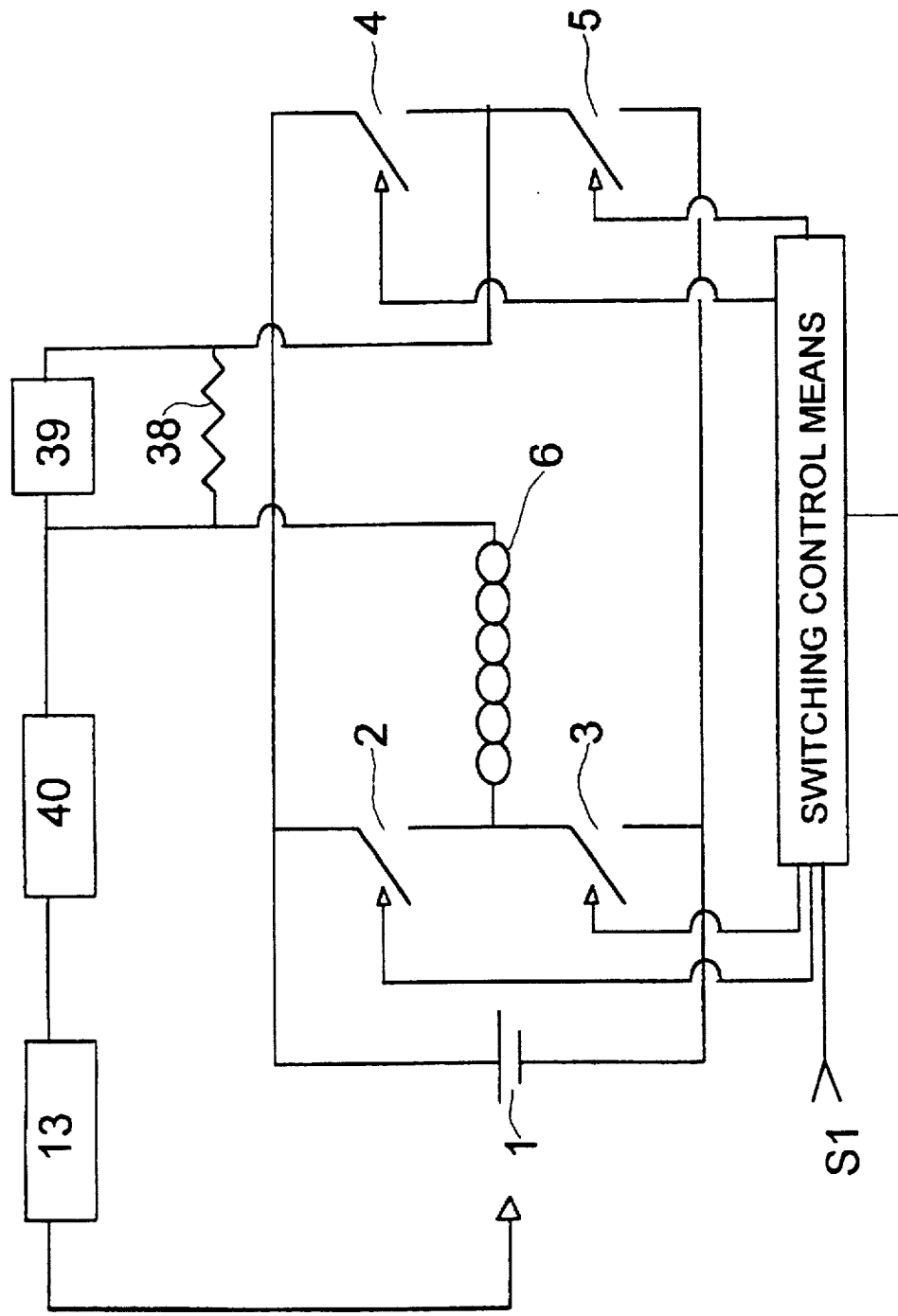
FIG. 5 is an electromagnetic focusing circuit in accordance with a fifth exemplary embodiment of the present invention.

FIG. 5 is an electromagnetic focusing circuit in accordance with a fifth exemplary embodiment of the present invention. The fifth exemplary embodiment is what a current detection resistor 38 and a current detection circuit 39 is connected in series to focusing coil 6 and supply voltage control means 13 is added in the first exemplary embodiment. The components having similar functions to those in FIG. 1 are numbered with the same reference numbers.

Figure 15A:
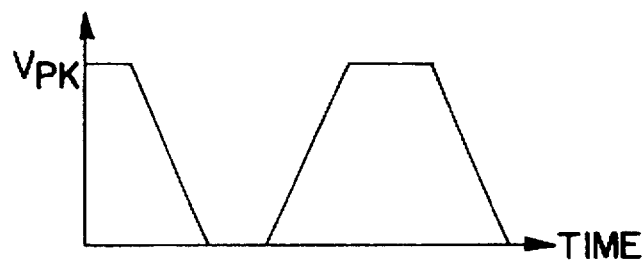
FIG. 15 shows voltage and current waveforms and switching periods of an electromagnetic focusing circuit in accordance with the fifth exemplary embodiment of the present invention.
Figure 15B:
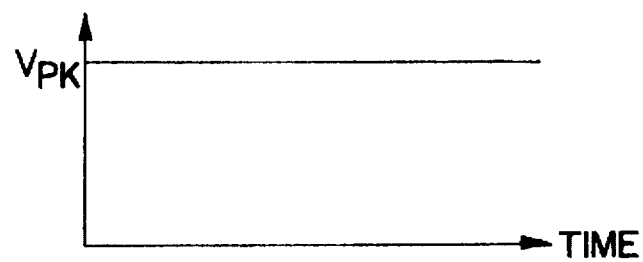
Figure 23:
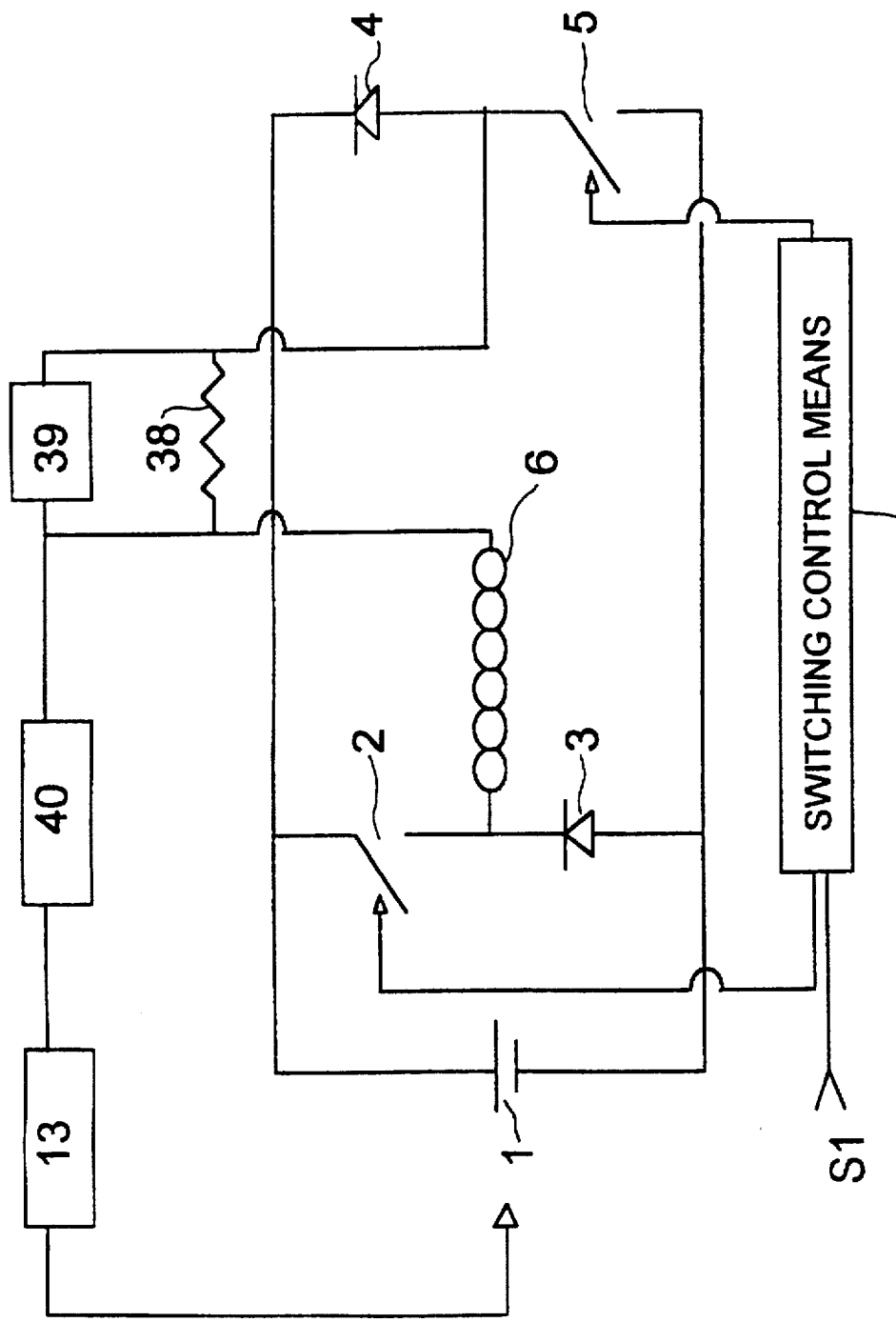
FIG. 23 is an electromagnetic focusing circuit.

The output of current detection circuit 39 is supplied to supply voltage control means 13 through signal transmitting means 40 such as a photocoupler. The supply voltage is controlled so that the focusing current is stabilized. Also, the supply voltage varying means varies the supply voltage according to the peak value of the focusing current. FIG. 15(a) shows a waveform of the output voltage across current detection resistor 38. FIG. 15(b) shows a waveform of the output voltage of current detection circuit 39. The fifth exemplary embodiment is similar to the first exemplary embodiment except the stabilization of the focusing current. FIG. 23 shows a similar circuit, with similar element numbering, with diodes replacing part of the switching means.

(Sixth exemplary embodiment

Figure 6:
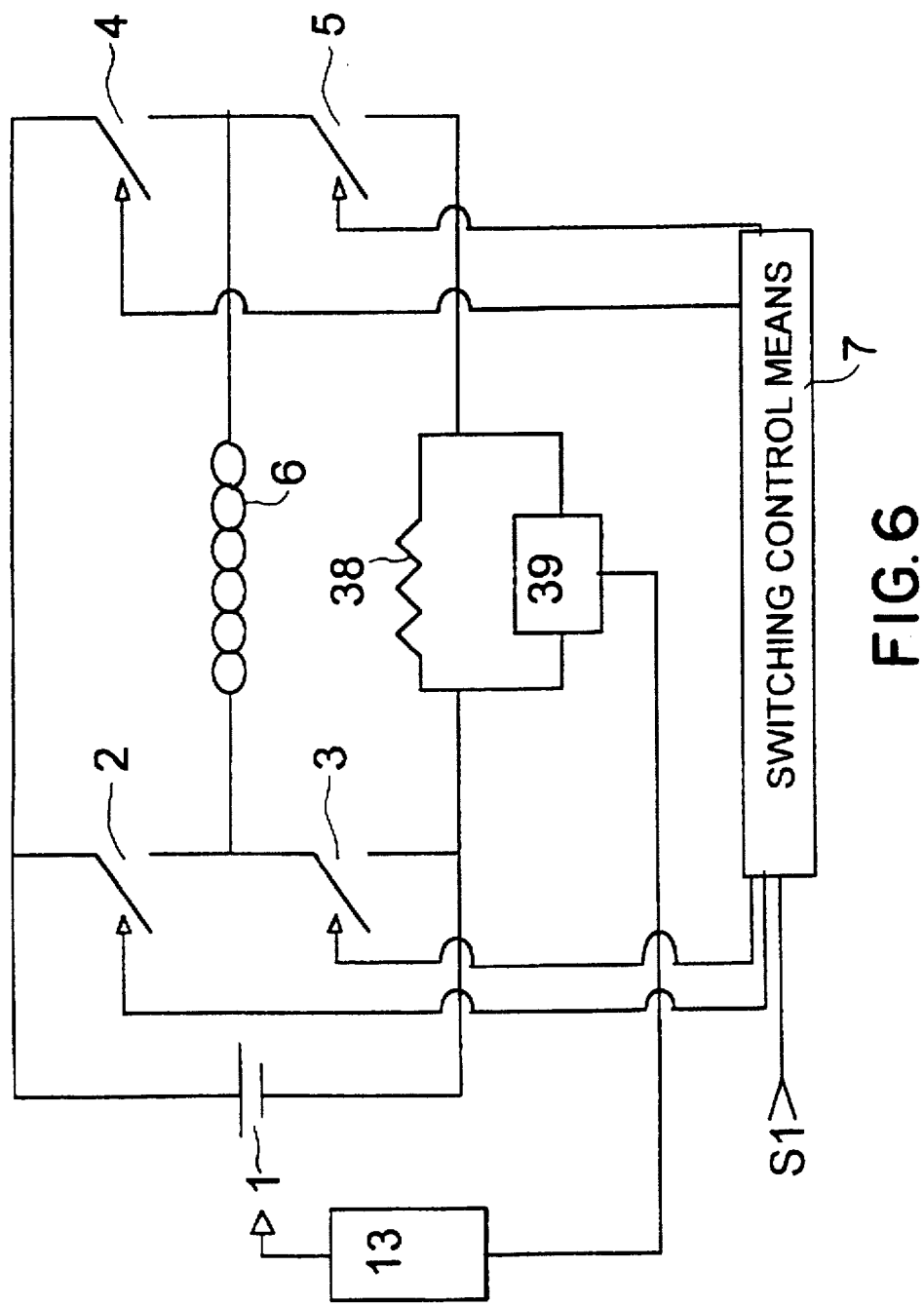
FIG. 6 is an electromagnetic focusing circuit in accordance with a sixth exemplary embodiment of the present invention.

FIG. 6 is an electromagnetic focusing circuit in accordance with a sixth exemplary embodiment of the present invention. The sixth exemplary embodiment is what a current detection resistor 38, a current detection circuit 39 and supply voltage control means 13 are added in the first exemplary embodiment. The components having similar functions to those in FIG. 1 are numbered with the same reference numbers.

Figure 16A:
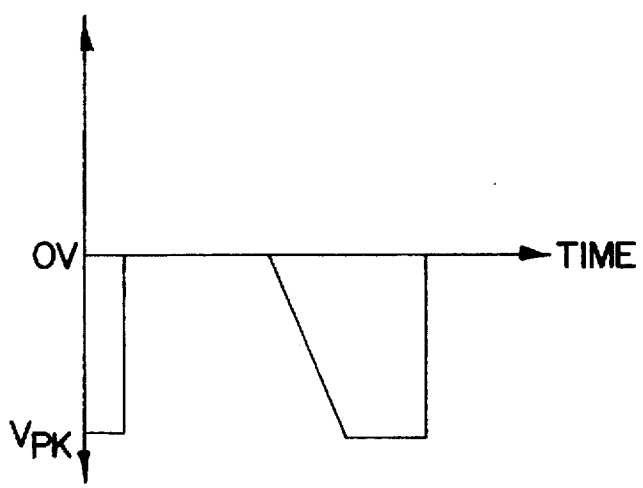
FIG. 16 shows voltage and current waveforms and switching periods of an electromagnetic focusing circuit in accordance with the sixth exemplary embodiment of the present invention.
Figure 16B:
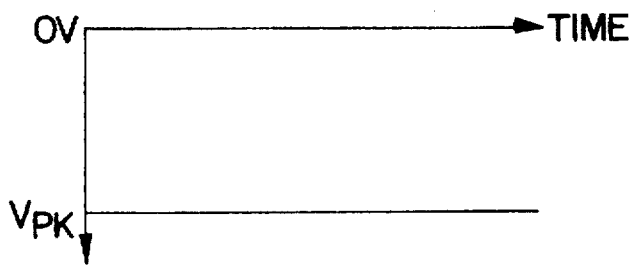
Figure 24:
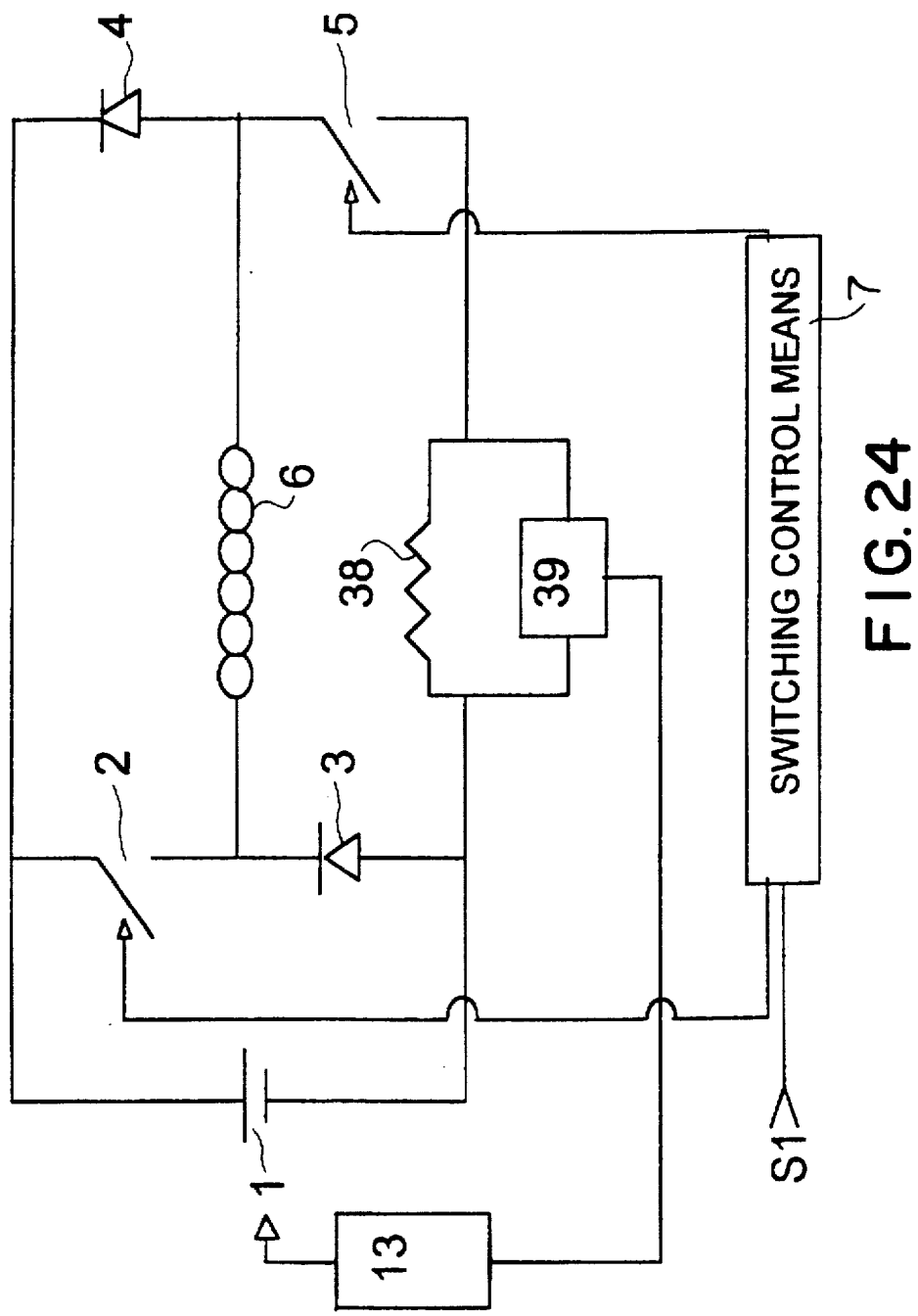
FIG. 24 is an electromagnetic focusing circuit.

Current detection circuit 39 detects a focusing current. The output of current detection circuit 39 is supplied to supplied voltage control means 13 through signal transmitting means such as a photocoupler. The supply voltage is controlled so that the focusing current is stabilized. FIG. 16(a) shows a waveform of the output voltage across current detection resistor 38. FIG. 15(b) shows a waveform of the output voltage of current detection circuit 39. The sixth exemplary embodiment is similar to the first exemplary embodiment except the stabilization of the focusing current. FIG. 24 shows a similar circuit, with similar element numbering, with diodes replacing part of the switching means.

(Seventh exemplary embodiment

Figure 7:
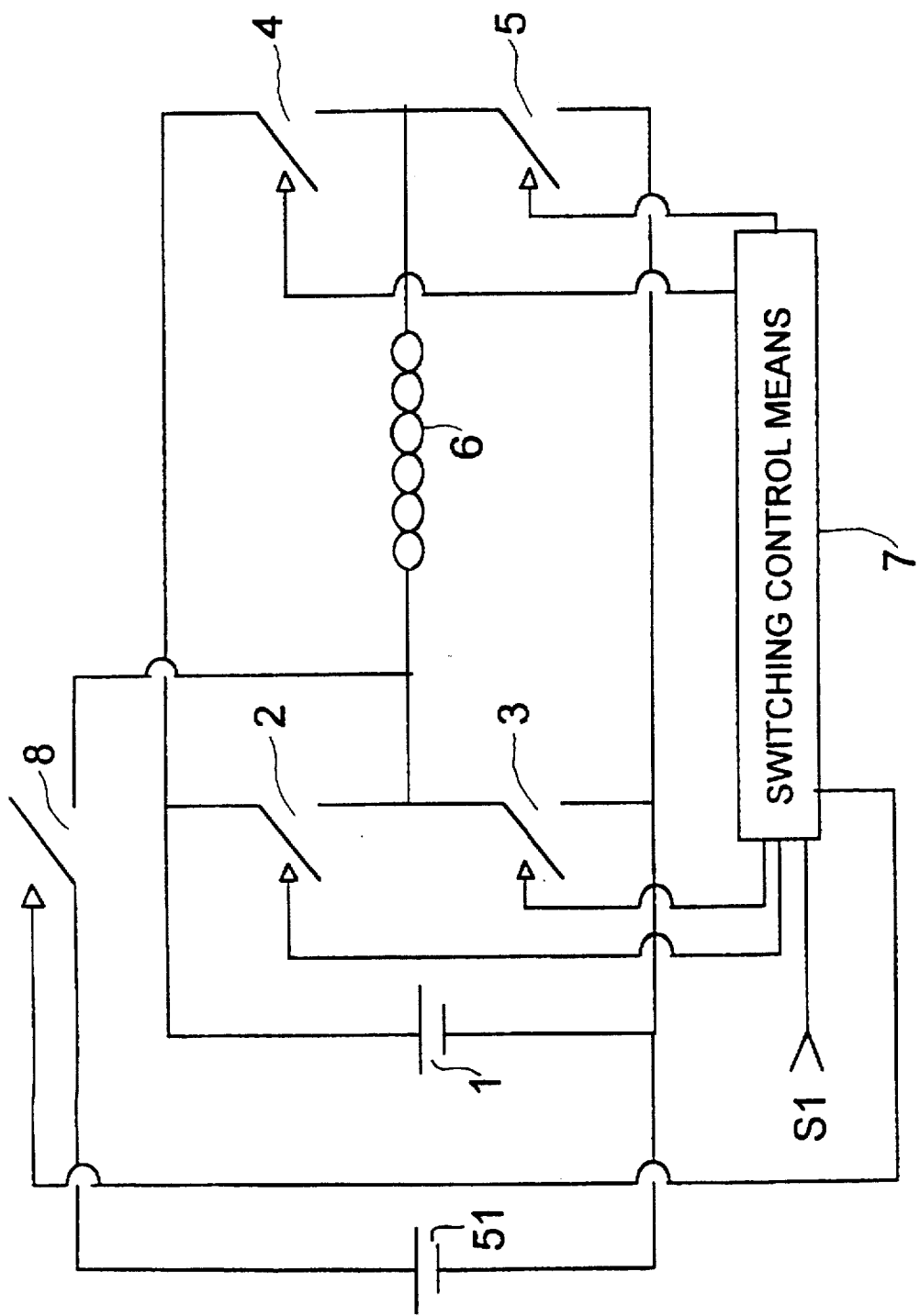
FIG. 7 is an electromagnetic focusing circuit in accordance with a seventh exemplary embodiment of the present invention.

FIG. 7 is an electromagnetic focusing circuit in accordance with a seventh exemplary embodiment of the present invention. The seventh exemplary embodiment is what a second power source 51 which supplies a variable supply voltage and switching means 8 are added in the first exemplary embodiment. The components having similar functions to those in FIG. 1 are numbered with the same reference numbers.

The on and off periods of each switching means are shown in FIG. 17(c). The switching means 8 is turned on only during a flywheel period in which power source 1 is disconnected. The variable supply voltage of the second power source 51 is applied across focusing coil 6 only when switching means 8 is on. Therefore, the voltage shown in FIG. 17(b) is applied across focusing coil 6. In the case in which second power source 51 is connected with the same polarity as that shown in FIG. 17, the voltage of second power source 51 is directly applied across focusing coil 6 and the focusing current increases during switch means 8 is on. In the case in which second power source 51 is connected with the inverse polarity to that shown in FIG. 17, the voltage of second power source 51 is inversely applied across focusing coil 6 and the focusing current decreases during switch means 8 is on. Three waveforms corresponding to three values of the variable supply voltage of the second power source 51 are shown in the same drawing FIG. 17(a).

(Eighth exemplary embodiment

Figure 8:
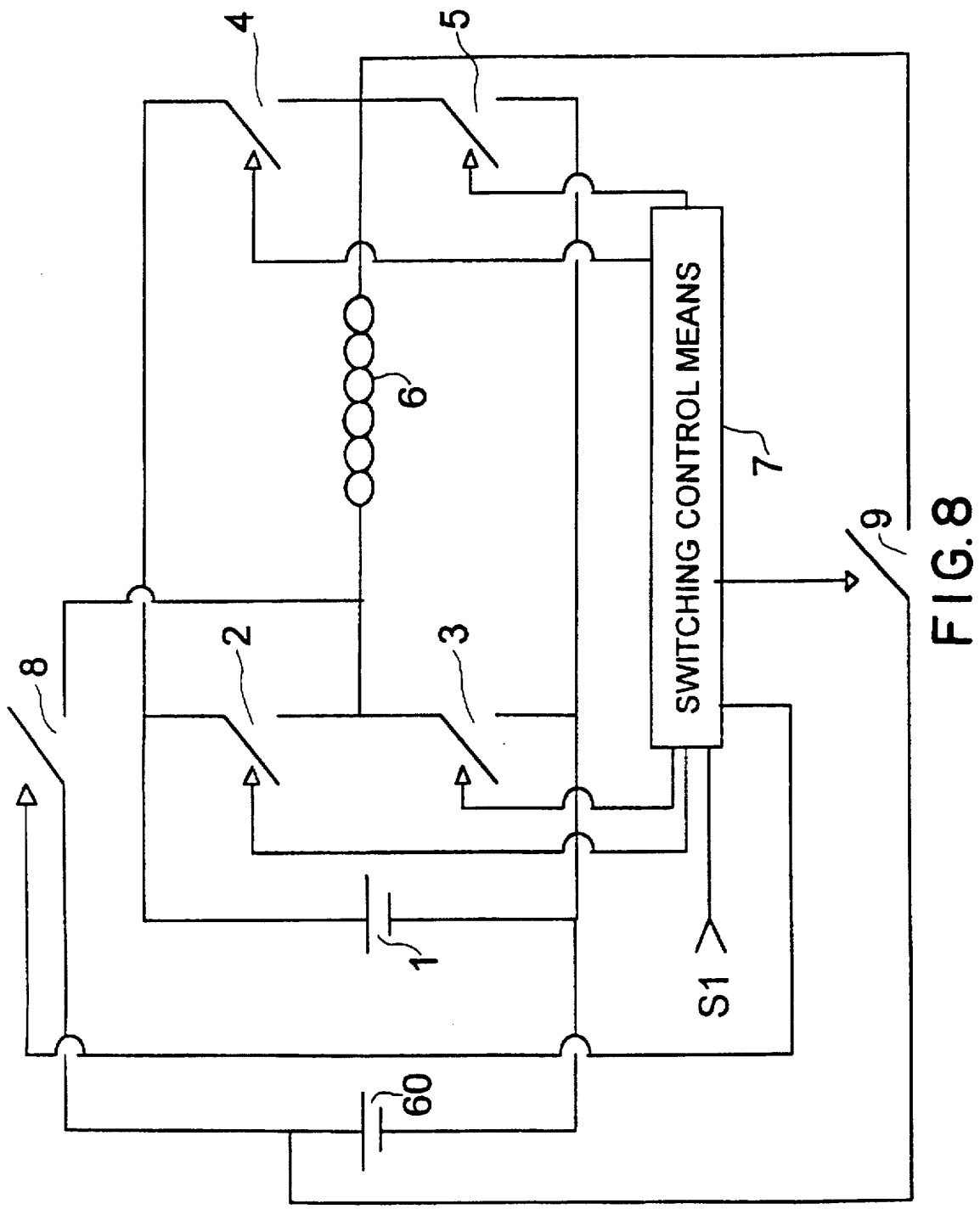
FIG. 8 is an electromagnetic focusing circuit in accordance with an eighth exemplary embodiment of the present invention.

FIG. 8 is an electromagnetic focusing circuit in accordance with an eighth exemplary embodiment of the present invention. The eighth exemplary embodiment is a second power source 60 and switching means 8 and 9 are added in the first exemplary embodiment. The components having similar functions to those in FIG. 1 are numbered with the same reference numbers.

The supply voltage of second power source 60 is higher than that of first power source 1. The negative side terminal of power source 60 is connected to the negative side terminal of power source 1. Switching means 8 is inserted between the positive side terminal of second power source 60 and one of terminals of focusing coil 6. Switching means 9 is inserted between the positive side terminal of second power source 60 and the other terminal of focusing coil 6.

The on and off periods of each switching means are shown in FIG. 18(d). A voltage shown in FIG. 18(c) is applied to focusing coil 6 and a focusing current shown in FIG. 18(b) flows in focusing coil 6. The waveform of the focusing current shown in FIG. 18(b) is approximate to the desirable parabolic waveform of the focusing current.

(Ninth exemplary embodiment

Figure 9:
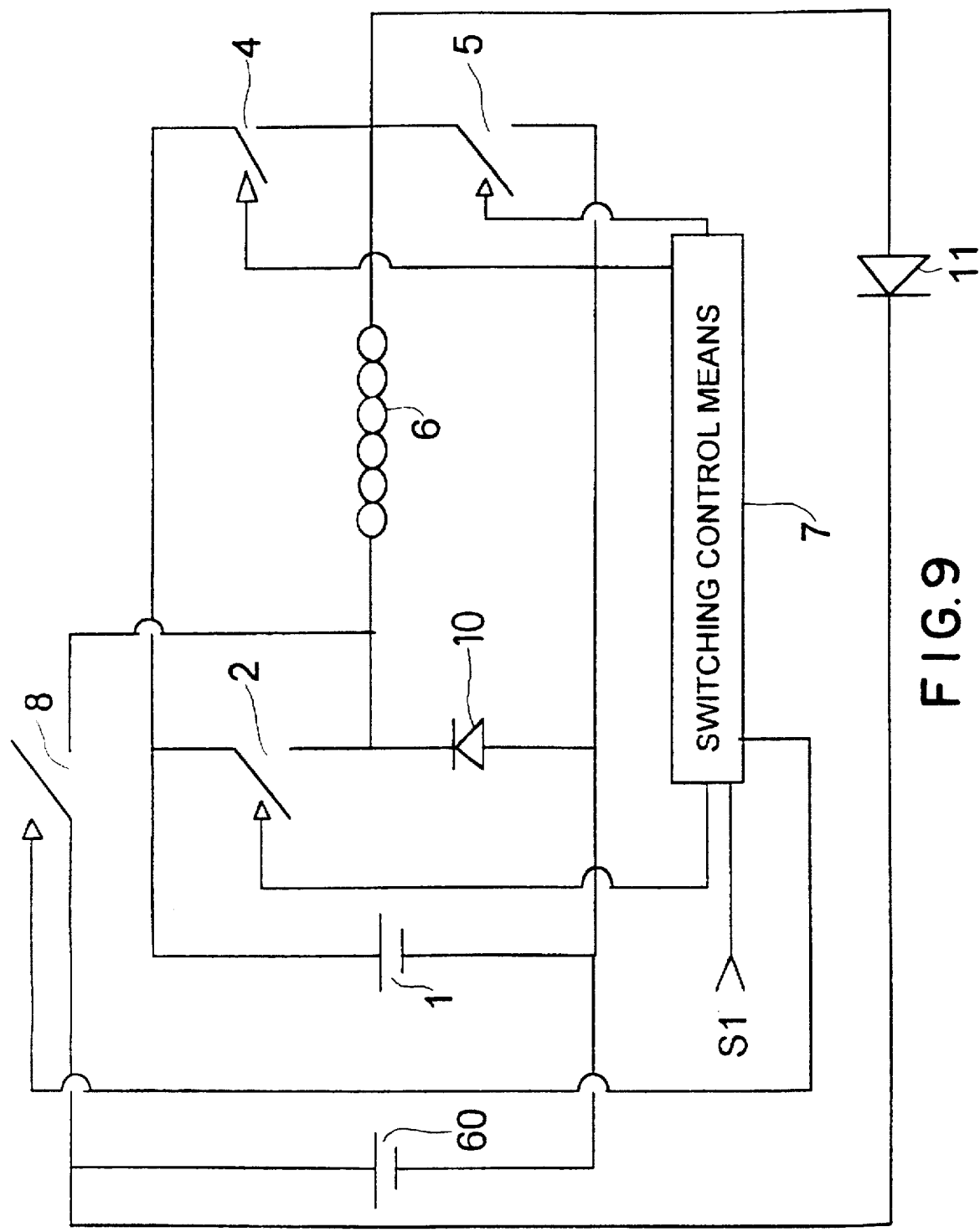
FIG. 9 is an electromagnetic focusing circuit in accordance with a ninth exemplary embodiment of the present invention.

FIG. 9 is an electromagnetic focusing circuit in accordance with a ninth exemplary embodiment of the present invention. The ninth exemplary embodiment is that switching means 8 and 9, in which a flywheel current flows, are replaced by diodes 10 and 11, respectively. Because this replacement does not give any influence to the flywheel current, the ninth exemplary embodiment works in the same way as the eighth exemplary embodiment.

The on and off period of each switching means are shown in FIG. 19(d). A voltage shown in FIG. 19(c) is applied across focusing coil 6 and a focusing current shown in FIG. 18(b) flows in focusing coil 6. The waveform of the focusing current shown in FIG. 18(b) is approximate to the desirable parabolic waveform of the focusing current. FIGS. 19(e) and 19(f) show waveforms of the voltages across diodes 10 and 11, respectively.

(Tenth exemplary embodiment

Figure 20A:
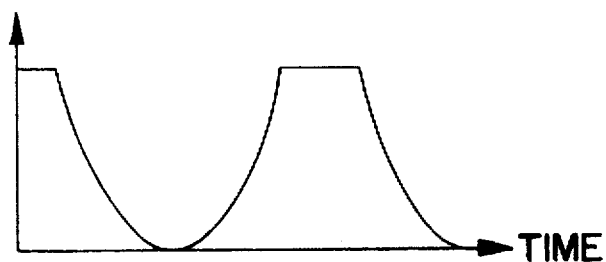
FIG. 20(a) is a desirable waveform of the focusing current.
Figure 20B:
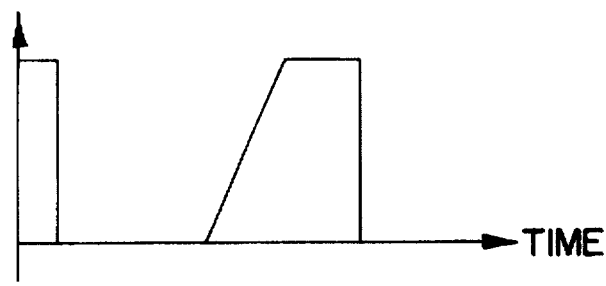
FIG. 20(b) is a waveform of the voltage across current detection resistor 81.
Figure 20C:
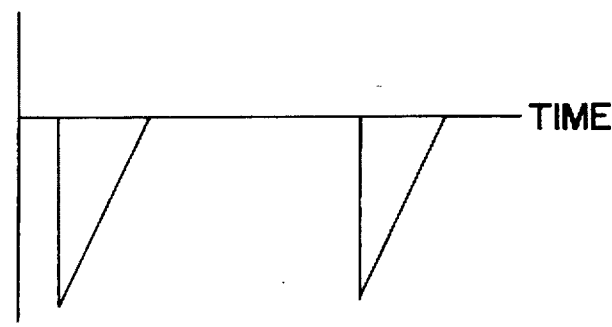
FIG. 20(c) is a waveform of the voltage across current detection resistor 99.
Figure 20D:
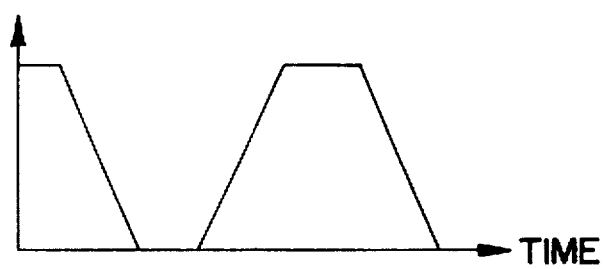
FIG. 20(d) is a waveform of the focusing current.
Figure 20E:
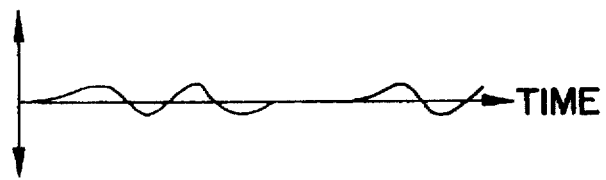
FIG. 20(e) is a difference between the desirable waveform and the actual waveform of the focusing current.
Figure 21:
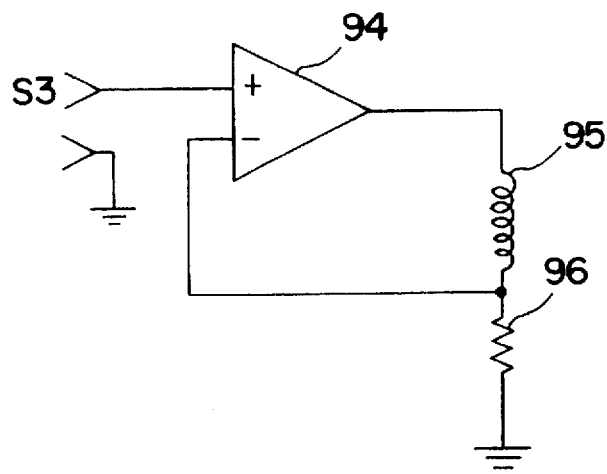
FIG. 21 is an electromagnetic focusing circuit in accordance with the prior art.
Figure 22A:
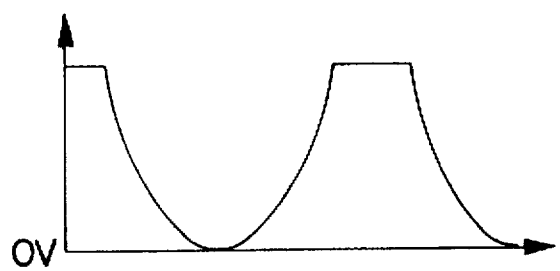
FIG. 22 shows voltage and current waveforms of an electromagnetic focusing circuit in accordance with the prior art.
Figure 22B:
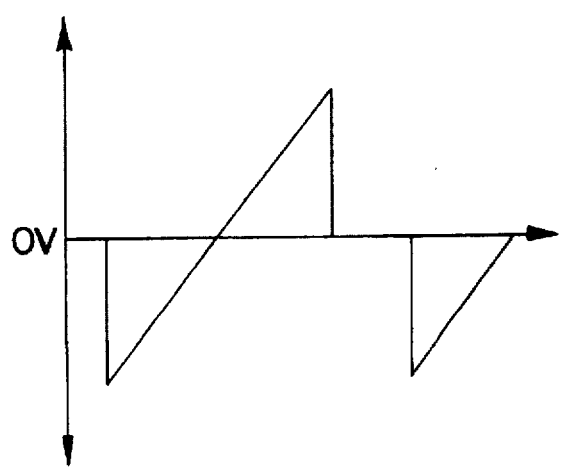
Figure 22C:
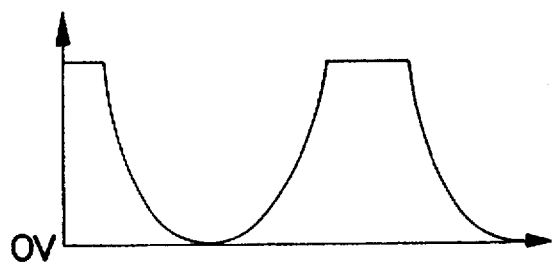

FIG. 10 is an electromagnetic focusing circuit in accordance with a tenth exemplary embodiment of the present invention. The focusing current is detected by current detection resistors 81 and 99. The waveforms of the voltages across current detection resistors 81 and 99 are shown in FIGS. 20(b) and 20 (c), respectively. The voltage across current detection resistor 81 is supplied to switching means 89. The voltage across current detection resistor 99 is supplied to switching means 89 through an invertor 88. Switching control means 87 outputs a selection command for commanding that one of the voltages across current detection resistors 81 and 99 is to be selected according to a horizontal signal S1. The focusing current having a trapezoid waveform shown in FIG. 20(d) is inputted to one input terminal of a subtracting amplifier 90. Subtracting amplifier 90 outputs a difference signal having a waveform shown in FIG. 20(e) between two input signals with a parabolic waveform shown in FIG. 12(a) to realize a desirable focusing current and the trapezoid waveform shown in FIG. 12(d). A class-A amplifier 91 outputs a current corresponding to the waveform shown in FIG. 12(e) to a second focusing coil 92. Class-A amplifier 91 controls the feedback of the current flowing in second focusing coil 92 according to the voltage across current detection resistor 93. A desirable focusing is realized by a summation of the focusing of first focusing coil 6 and second focusing coil 92.

What is claimed:

1. An electromagnetic focusing circuit for a cathode-ray tube comprising:

a power source having a positive electrode and a negative electrode;

a focusing coil having a first terminal and a second terminal;

first switching means connected between the positive electrode of said power source and the first terminal of said focusing coil;

second switching means connected between the negative electrode of said power source and the first terminal of said focusing coil;

third switching means connected between the positive electrode of said power source and the second terminal of said focusing coil;

fourth switching means connected between the negative electrode of said power source and the second terminal of said focusing coil;

switching control means for individually turning each switching means on or off according to a command determining the current flowing in said focusing coil producing a one-directional focusing current of trapezoidal waveform approximating a desirable parabolic waveform.

2. An electromagnetic focusing circuit for a cathode-ray tube as recited in claim 1, further comprising:

supply voltage varying means for varying the supply voltage of said power source.

3. An electromagnetic focusing circuit for a cathode-ray tube as recited in claim 2, wherein:

said supply voltage varying means varies the supply voltage according to the peak value of the focusing current.

4. An electromagnetic focusing circuit for a cathode-ray tube as recited in claim 2, further comprising:

current detection means for detecting the focusing current.

5. An electromagnetic focusing circuit for a cathode-ray tube as recited in claim 1 wherein said trapezoidal current has 1) a current increasing period when energy is supplied to the focusing coil from the power source, 2) a constant current period by a flywheel current, and 3) a current decreasing period when charging the power source.

6. An electromagnetic focusing circuit for a cathode-ray tube comprising:

a power source having a positive electrode and a negative electrode;

a focusing coil having a first terminal and a second terminal;

first switching means connected between the positive electrode of said power source and the first terminal of said focusing coil; second switching means connected between the negative electrode of said power source and the second terminal of said focusing coil;

a first diode having a cathode and an anode said cathode is connected to the first terminal of said focusing coil and said anode is connected to the negative electrode of said power source;

a second diode having a cathode and an anode said anode is connected to the second terminal of said focusing coil and said cathode is connected to the positive electrode of said power source;

switching control means for individually turning each switching means on or off according to a command determining the current flowing in said focusing coil producing a one-directional focusing current of trapezoidal waveform approximating a desirable parabolic waveform.

7. An electromagnetic focusing circuit for a cathode-ray tube as recited in claim 6, further comprising:

supply voltage varying means for varying the supply voltage of said power source.

8. An electromagnetic focusing circuit for a cathode-ray tube as recited in claim 7, further comprising:

current detection means for detecting the focusing current.

9. An electromagnetic focusing circuit for a cathode-ray tube as recited in claim 7, wherein:

said supply voltage varying means varies the supply voltage according to the peak value of the focusing current.

10. An electromagnetic focusing circuit for a cathode-ray tube as recited in claim 6 wherein said trapezoidal current has 1) a current increasing period when energy is supplied to the focusing coil from the power source, 2) a constant current period by a flywheel current, and 3) a current decreasing period when charging the power source.

11. An electromagnetic focusing circuit for a cathode-ray tube comprising:

a power source having a positive electrode and a negative electrode;

a series connection of a focusing coil and a reactor having a first terminal and a second terminal;

first switching means connected between the positive electrode of said power source and the first terminal of said series connection of the focusing coil and the reactor;

second switching means connected between the negative electrode of said power source and the first terminal of said series connection of the focusing coil and the reactor;

third switching means connected between the positive electrode of said power source and the second terminal of said series connection of said focusing coil and the reactor;

fourth switching means connected between the negative electrode of said power source and the second terminal of said series connection of the focusing coil and the reactor;

switching control means for individually turning each switching means on or off according to a command determining the current flowing in said focusing coil producing a one-directional focusing current of trapezoidal waveform approximating a desirable parabolic waveform.

12. An electromagnetic focusing circuit for a cathode-ray tube as recited in claim 11, wherein:

said reactor is a saturable-core reactor.

13. An electromagnetic focusing circuit for a cathode-ray tube as recited in claim 11 wherein said trapezoidal current has 1) a current increasing period when energy is supplied to the focusing coil from the power source, 2) a constant current period by a flywheel current, and 3) a current decreasing period when charging the power source.

14. An electromagnetic focusing circuit for a cathode-ray tube comprising:

a first power source having a positive electrode and a negative electrode;

a second power source having a positive electrode and a negative electrode, wherein the negative electrode of said second power source is connected to the negative electrode of said first power source;

a focusing coil having a first terminal and a second terminal;

first switching means connected between the positive electrode of said first power source and the first terminal of said focusing coil;

second switching means connected between the positive electrode of said first power source and the second terminal of said focusing coil;

third switching means connected between the negative electrode of said first power source and the second terminal of said focusing coil;

fourth switching means connected between the positive electrode of said second power source and the first terminal of said focusing coil;

a first diode having a cathode and an anode said cathode is connected to the first terminal of said focusing coil and said anode is connected to the negative electrode of said first power source;

a second diode having a cathode and an anode said cathode is connected to the positive electrode of said second power source and said anode is connected to the second terminal of said focusing coil; and switching control means for individually turning each switching means on or off according to a command determining the current flowing in said focusing coil.

15. An electromagnetic focusing circuit for a cathode-ray tube comprising:

a power source having a positive electrode and a negative electrode;

a first focusing coil having a first terminal and a second terminal;

a second focusing coil having a first terminal and a second terminal, wherein said second focusing coil works together with said first focusing coil for focusing of a cathode-ray tube;

first switching means connected between the positive electrode of said power source and the first terminal of said first focusing coil;

second switching means connected between the negative electrode of said power source and the first terminal of said first focusing coil;

third switching means connected between the positive electrode of said power source and the second terminal of said first focusing coil;

fourth switching means connected between the negative electrode of said power source and the second terminal of said first focusing coil;

switching control means for individually turning each switching means on or off according to a command determining the current flowing in said focusing coil;

current detection means for detecting a current flowing in said first focusing coil; and current control means for said second focusing coil for supplying a current to said second focusing coil corresponding to the difference between the command value for the current flowing in said first focusing coil and the detected value of said current detection means.

16. An electromagnetic focusing circuit for a cathode-ray tube comprising:

a capacitor having a first terminal and a second terminal;

a series connection of a power source and current control means, which is connected in parallel with said capacitor, wherein said power source has a positive electrode and a second electrode;

said current control means controls a charging current flowing from said power source to said capacitor;

a focusing coil having a first terminal and a second terminal;

first switching means connected between the positive electrode of said power source and the first terminal of said capacitor;

second switching means connected between the negative electrode of said power source and the first terminal of said capacitor;

third switching means connected between the positive electrode of said power source and the second terminal of said capacitor;

fourth switching means connected between the negative electrode of said power source and the second terminal of said capacitor; and switching control means for individually turning each switching means on or off according to a command determining the current flowing in said focusing coil.

17. An electromagnetic focusing circuit for a cathode-ray tube comprising:

a first power source having a positive electrode and a negative electrode;

a second power source having a first electrode and a second electrode, wherein the second electrode of said second power source is connected to the negative electrode of said first power source;

a focusing coil having a first terminal and a second terminal;

first switching means connected between the positive electrode of said first power source and the first terminal of said focusing coil;

second switching means connected between the negative electrode of said first power source and the first terminal of said focusing coil;

third switching means connected between the positive electrode of said first power source and the second terminal of said focusing coil;

fourth switching means connected between the negative electrode of said first power source and the second terminal of said focusing coil;

fifth switching means connected between the first electrode of said-second power source and the first terminal of said focusing coil; and switching control means for individually turning each switching means on or off according to a command determining the current flowing in said focusing coil.

18. An electromagnetic focusing circuit for a cathode-ray tube comprising:

a first power source having a positive electrode and a negative electrode;

a second power source having a positive electrode and a negative electrode, wherein the negative electrode of said second power source is connected to the negative electrode of said first power source;

a focusing coil having a first terminal and a second terminal;

first switching means connected between the positive electrode of said first power source and the first terminal of said focusing coil;

second switching means connected between the negative electrode of said first power source and the first terminal of said focusing coil;

third switching means connected between the positive electrode of said first power source and the second terminal of said focusing coil;

fourth switching means connected between the negative electrode of said first power source and the second terminal of said focusing coil;

fifth switching means connected between the positive electrode of said second power source and the first terminal of said focusing coil;

sixth switching means connected between the positive electrode of said second power source and the second terminal of said focusing coil; and switching control means for individually turning each switching means on or off according to a command determining the current flowing in said focusing coil.

* * * * *

UNITED STATES PATENT AND TRADE MARK OFFICE
CERTIFICATE OF CORRECTION

PATENT NO. : 5,747,949
DATED : May 5, 1998
INVENTOR(S) : Gyoten et al.

It is certified that error appears in the above-identified patent and that said Letters Patent is hereby corrected as shown below:

Cover page, item [57] Abstract, line 1, after "A" insert --switching--.

Column 13, line 11, delete the hyphen between "said" and "second".

Signed and Sealed this

Twentieth Day of April, 1999

Attest:

Q. TODD DICKINSON

*Attesting Officer*     Acting Commissioner of Patents and Trademarks